US 8,966,477 B2

(12) United States Patent
Cen et al.

(10) Patent No.: US 8,966,477 B2
(45) Date of Patent: Feb. 24, 2015

(54) COMBINED VIRTUAL GRAPHICS DEVICE

(75) Inventors: Shanwei Cen, Portland, OR (US);
Raman Srinivasan, Portland, OR (US);
David J. Cowperthwaite, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 13/089,066

(22) Filed: Apr. 18, 2011

(65) Prior Publication Data

US 2012/0266165 A1   Oct. 18, 2012

(51) Int. Cl.
*G06F 9/455* (2006.01)
*G06F 9/46* (2006.01)
*G06F 13/00* (2006.01)
*G06F 9/48* (2006.01)

(52) U.S. Cl.
CPC .......... *G06F 9/4856* (2013.01); *G06F 9/45541* (2013.01)
USPC ................. 718/1; 719/323; 719/324; 703/23; 703/24; 703/25

(58) Field of Classification Search
None
See application file for complete search history.

(56) References Cited

U.S. PATENT DOCUMENTS

| 2005/0081212 A1 | 4/2005 | Goud et al. |
| 2008/0294808 A1* | 11/2008 | Mahalingam et al. .......... 710/26 |
| 2008/0294825 A1* | 11/2008 | Mahalingam et al. ........ 710/262 |
| 2009/0113110 A1 | 4/2009 | Chen et al. |
| 2009/0119087 A1* | 5/2009 | Ang et al. ....................... 703/23 |
| 2009/0119684 A1* | 5/2009 | Mahalingam et al. ........ 719/324 |
| 2010/0162242 A1 | 6/2010 | Grouzdev |
| 2011/0087822 A1 | 4/2011 | Bennett et al. |

OTHER PUBLICATIONS

International Search Report for PCT Patent Application No. PCT/US2011/062022, Mailed Jun. 26, 2012, 9 Pages.
International Preliminary Report on Patentability for PCT Patent Application No. PCT/US2011/062022, Mailed Oct 31, 2013 6 Pages.

* cited by examiner

*Primary Examiner* — Qing Wu
(74) *Attorney, Agent, or Firm* — Blakely, Sokoloff, Taylor & Zafman LLP

(57) ABSTRACT

A system comprises a guest graphics subsystem with a combined virtual graphics device that combines underlying emulated virtual graphics device and virtual function of a physical graphics device to support virtual machine migration. The VMM in the system may expose to the guest a single combined virtual PCIe graphics device that combines access to the virtual graphics device and the virtual function, and switches between the virtual graphics device and the virtual function for graphics acceleration without triggering a PnP event in the guest OS. In response to the switch, the guest graphics stack and applications may redraw their windows to provide a consistent user experience.

17 Claims, 4 Drawing Sheets

COMBINED VIRTUAL GRAPHICS DEVICE

BACKGROUND

Virtualization enables a single host machine with hardware and software support for virtualization to present an abstraction of the host, such that the underlying hardware of the host machine appears as one or more independently operating virtual machines. Each virtual machine may therefore function as a self-contained platform. Virtualization technology may be used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems may include a virtual machine monitor (VMM) which controls access to the host machine. In some embodiments, any other VM control logic may be utilized. The VMM may provide guest software operating in a virtual machine with a set of resources (e.g., processors, memory, IO devices). The VMM may map some or all of the components of a physical host machine into the virtual machine, and may create virtual components, emulated in software within the VMM, which are available to the virtual machine (e.g., virtual IO devices). The VMM may use features of a hardware virtualization architecture to provide services to a virtual machine and to provide protection from and between multiple virtual machines executing on the host machine.

In a virtualized computing environment, a virtual machine may be migrated from one physical platform to another, either through "live migration" or through saving and restoring the state of the VM. In the case that all platform resources presented to the VM are virtual, the VMM may transfer the state of all of these resources. In the case that an interface to a physical graphics device function (e.g., virtual function of a single-root I/O virtualization (SR-IOV) capable device or a dedicated device mapped with the support of an input/output memory management module (IOMMU) has been provided to a VM, the process of migration may be inhibited. In one case, the target platform for migration may have no hardware graphics devices that are available for the guest OS. In another case, the graphics hardware on the target platform may differ from the source. In the case of compatible hardware being available at the target, the VMM may not transfer all of the relevant device state information. With graphics virtualization and VM migration, guest OS may need to support dynamic changes to the hardware-based graphics devices as they become available and are assigned by the virtual machine monitor (VMM) to the VM. Some operating systems may not support dynamic plug-and-play of graphics devices.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques to provide a usage model to enable a combined virtual graphic apparatus. In one embodiment, the combined virtual graphic apparatus may be implemented in a virtual machine environment. In another embodiment, the combined virtual graphic functions may be implemented in a processor based computing system. The implementation of the techniques is not restricted in computing systems; it may be used by any execution environment for similar purposes, such as, for example, any other digital/electronic apparatus or system. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting.

Figure 1:
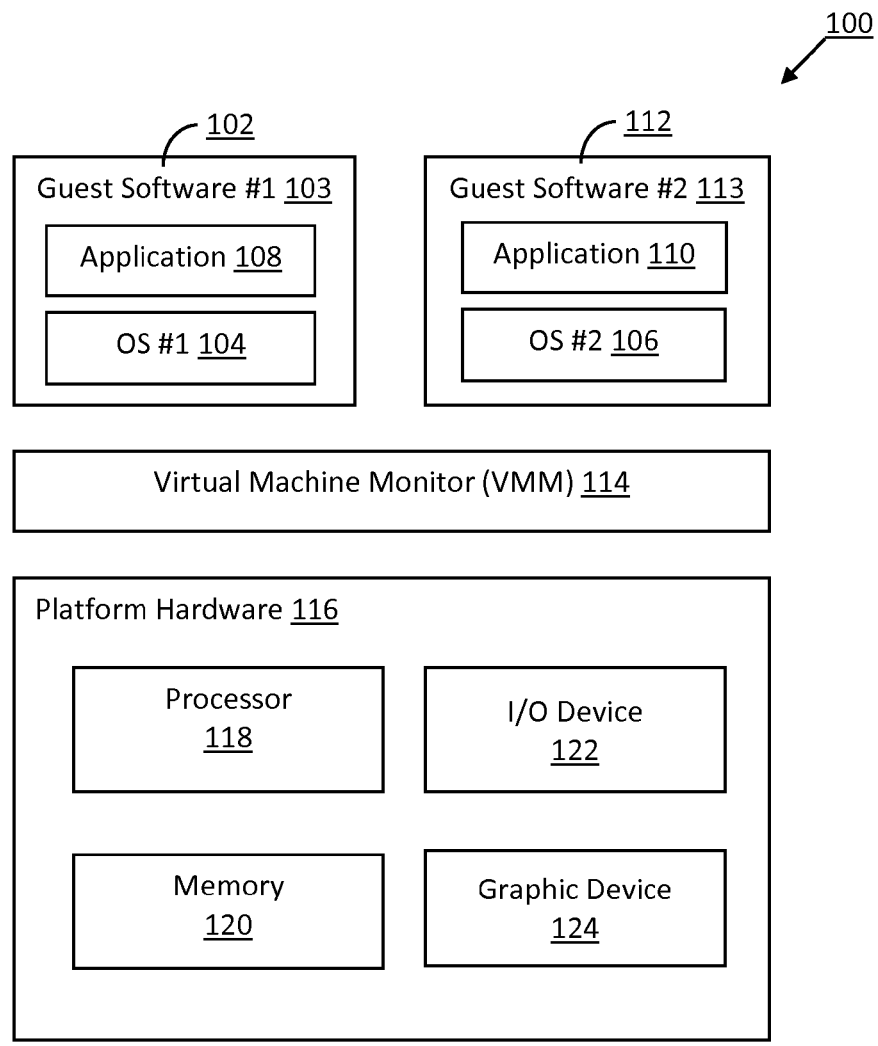
FIG. 1 is a schematic diagram of a high level structure of an exemplary virtual machine environment according to an embodiment of the invention.

FIG. 1 is a block diagram one embodiment of a virtual-machine environment 100. In this embodiment, a processor-based platform 116 may execute a VMM 114. The VMM, though implemented in software, may emulate and export a virtual machine interface to higher level software. Such higher level software may comprise a standard OS, a real time OS, or may be a stripped-down environment with limited operating system functionality and may not include OS facilities available in a standard OS in some embodiments. Alternatively, for example, the VMM 114 may be run within, or using the services of, another VMM. VMMs may be implemented, for example, in hardware, software, firmware or by a combination of various techniques in some embodiments. In at least one embodiment, one or more components of the VMM may execute in one or more virtual machines and one or more components of the VMM may execute on the platform hardware as depicted in FIG. 1. The components of the VMM executing directly on the platform hardware are referred to herein as host components of the VMM. In another embodiment, examples of VMM 114 may comprise a hybrid virtual machine monitor, a host virtual machine monitor or a hypervisor virtual machine monitor.

The platform hardware 116 may be a personal computer (PC), server, mainframe, handheld device such as a personal digital assistant (PDA), tablets, smart phone or any other smart devices, Internet Protocol device, digital camera, portable computer, handheld PC such as netbook or notebook, or embedded applications such as a micro controller, a digital signal processor (DSP), system on a chip (SoC), network computers (NetPC), set-top boxes, network hubs, wide area network (WAN) switches, or another processor-based system.

The platform hardware 116 includes at least a processor 118 and memory 120. Processor 118 may be any type of processor capable of executing programs, such as a microprocessor, digital signal processor, microcontroller, or the like. The processor may include microcode, programmable logic or hard coded logic for execution in embodiments. Although FIG. 1 shows only one such processor 118, there may be one or more processors in the system in an embodiment. Additionally, processor 118 may include multiple cores, support for multiple threads, or the like. The processor 118 may include microcode, programmable logic or hard-coded logic to perform operations associated with various embodiments described herein.

Memory 120 may comprise a hard disk, a floppy disk, random access memory (RAM), read only memory (ROM), flash memory, any other type of volatile memory devices or non-volatile memory devices, or combination of the above devices, or any other type of machine medium readable by processor 118 in various embodiments. Memory 120 may store instructions and/or data for performing program execution and other method embodiments. In some embodiments, some elements of the invention may be implemented in other system components, e.g., in the platform chipset or in the system's one or more memory controllers.

The VMM 114 may present to guest software an abstraction of one or more virtual machines. The VMM 114 may present the same or different abstractions of physical platform to different VMs. The embodiment of FIG. 1 shows two virtual machines, 102 and 112. Guest software such as guest software 103 and 113 running on each virtual machine may include a guest OS such as a guest OS 104 or 106 and various guest software applications 108 and 110. Guest software 103 and 113 may access physical resources (e.g., processor registers, memory and I/O devices) within the virtual machines on which the guest software 103 and 113 is running and to perform other functions. For example, the guest software 103 and 113 may have access to all registers, caches, structures, I/O devices, memory and the like, according to the architecture of the processor and platform presented in the virtual machine 102 and 112.

In one embodiment, the processor 118 may control the operation of the virtual machines 102 and 112. In one embodiment, in response to a virtual machine 102 referencing a memory location in its virtual address space, a reference to an actual address in the physical memory of the host machine 116 (machine physical memory) may be generated by memory management module (not shown) in VMM 114, which may be implemented in hardware (sometimes incorporated into the processor 118) and software (for example, in the operating system of the host machine). In the embodiment of FIG. 1, the platform hardware 116 may further comprise one or more I/O devices 122. The platform hardware 116 may further comprise one or more graphic control or devices 124 that may be used to perform one or more graphics functions; in some embodiments, the platform hardware 116 may comprise any other physical graphics devices.

Figure 2:
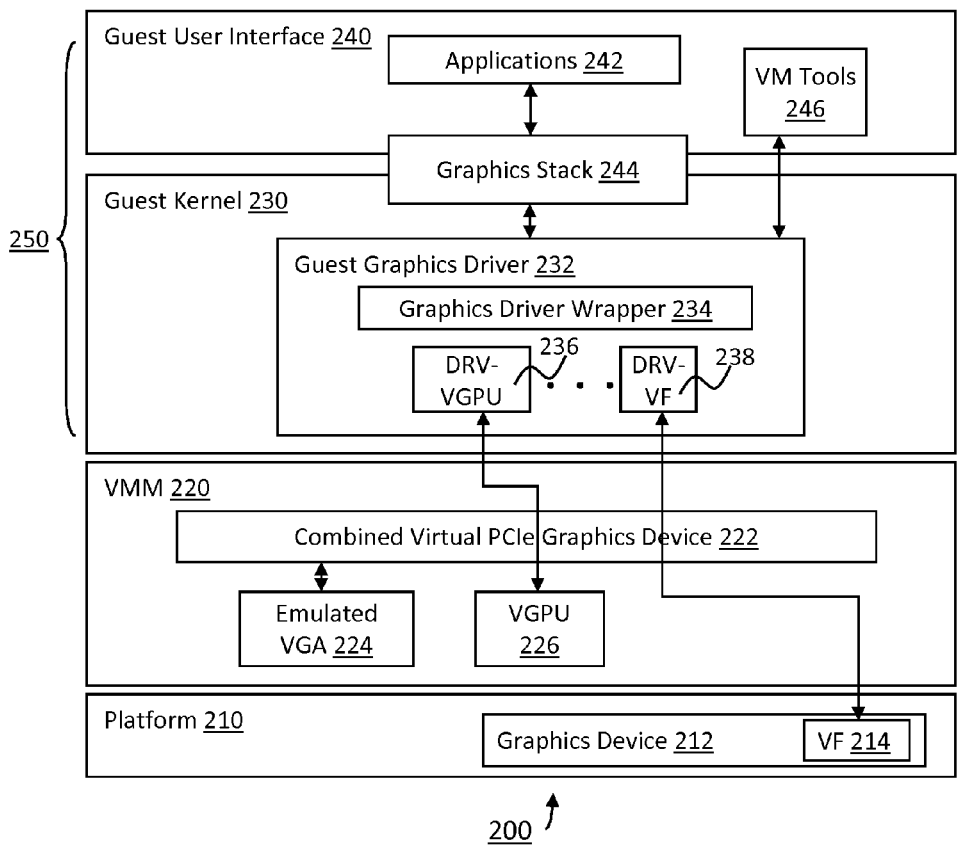
FIG. 2 is a schematic diagram of an embodiment of an apparatus.

FIG. 2 illustrates an example of a combined virtual graphic apparatus that may be implemented in a virtual machine environment, in accordance with one embodiment. Referring to FIG. 2, the virtual machine environment 200 may comprise a virtual machine monitor (VMM) 220 and platform 210. The platform 210 may comprise hardware such as processor 118, memory 120, input/output device 122, graphics device 124; however, in some embodiments, platform 210 may comprise any other platform hardware devices. In one embodiment, the processor in platform 210 may be any type of processor capable of executing software instructions, e.g., a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, a microprocessor, a digital signal processor or a microcontroller, or the like. The processor in platform 210 may include microcode, programmable logic or hard-coded logic for performing operations associated with various embodiments described herein. In one embodiment, there may be one or more processors in the platform 210 and one or more processors may include multiple threads, multiple cores, or the like.

The embodiment is not limited to computing systems. Alternative embodiments of the present invention can be used in any form factor devices such as handheld devices and embedded applications. The platform 210 may comprise hardware platform of a handheld device, portable computer, set-top box, or any other processor based system. Some examples of handheld devices may include cellular phones, smart phone, tablets, Internet Protocol devices, digital cameras, personal digital assistants (PDAs), or handheld PCs such as netbook or notebook. Embedded applications may include a micro controller, a digital signal processor (DSP), system on a chip (SoC), network computers (NetPC), set-top boxes, network hubs, wide area network (WAN) switches, or any other system.

Referring to FIG. 2, in an embodiment, VMM 220 may present to other software the abstraction of one or more VMs or virtual systems (not shown). In one embodiment, VMM 220 may enable the hardware resources in the environment 200 to be distributed across one or more concurrent operating system sessions executing within VMs or virtual systems. Each VM on a guest platform 250 may function as a self-contained platform, running its own "guest operating system" (an operating system (OS) hosted by the VMM) and other software, collectively referred to as guest software. In an embodiment, guest platform 250 may control various events and may be able to access various hardware resources. Guest software running on each virtual machine of the guest platform 250 may include a guest OS or guest kernel 230 and various guest software applications 242 on a guest user 240. VMM 220 may be implemented in hardware, software, firmware, or in combinations. In one embodiment, the guest platform 250 may function as a guest graphics subsystem.

Referring to FIG. 2, in an embodiment, the platform 210 may comprise a physical graphics device 212. In one embodiment, the physical graphics device 212 may support a hardware virtualization standard such as SR-IOV or any other standard and the VMM 220 may assign one or more virtual functions 214 of the physical graphics device 212 to the guest OS 230. In the embodiment of FIG. 2, VMM 220 may expose to the guest OS 230 a combined virtual graphics device (CVGD) 222. In one embodiment, the combined virtual graphics device 222 may combines an underlying emulated video graphics array (VGA) device 224, a virtual graphics device such as an emulated virtual graphics processing unit (VGPU) 226, and the virtual function (VF) 214 of the physical graphics device 212 to provide software-emulated VGA capability through VGA 224 and graphics capabilities through one of VGPU 226 and VF 214 of device 212. In another embodiment, the combined virtual graphics device 222 may be presented to the VM as a single peripheral component interconnect express (PCIe) graphics device that may combine access to VGPU 226 and VF 214. The combined virtual graphics device 222 may switch between VGPU 226 and VF 214, e.g., for graphics acceleration and/or other graphics capabilities provided to the VM.

VGA 224 provided by VMM 220 may augment the virtual functions 214 of the graphics device 212. In one embodiment, VGA 224 may be used during, e.g., boot process (before VF driver is loaded) and/or for diagnostic output. In some embodiments, VMM 220 may provide super VGA in the combined virtual graphics device 222 to the guest OS 230 to support, e.g., improved graphics capability. In one embodiment, for a platform without VF 214, VMM 220 may implement emulated graphics processing capabilities such as graphics and/or media rendering capabilities with software emulation (e.g., VGPU 226) or with acceleration by host graphics hardware. VMM 220 may dynamically switch between underlying emulated VGPU 226 and VF 214 within the same combined virtual graphics device 222, without triggering, e.g., a plug-and-play (PnP) event in the guest OS 230.

In one embodiment, VMM 220 may expose to the guest OS 230 a PCIe configuration space for the combined virtual graphic device 222. The PCIe configuration space may be independent of which of the underlying graphics devices is used. For example, VMM 220 may maintain the same PCIe configuration space for the combined virtual graphics device 222 regardless, e.g., whether emulated graphics device VGPU 226 or VF 214 is used or the virtual function is from which graphics hardware. VMM 220 may further maintain a mapping from the combined virtual graphics PCIe configuration space (e.g., visible to guest OS) to the active underlying device. The configuration space may have over-provision numbers and/or sizes of base address registers (BARs) to cover configurations of one or more of the underlying devices.

In one embodiment, PCI-e configuration space may comprise one or more registers and/or field. For example, the virtual graphics PCIe configuration space may comprise data fields such as vender identity (VID), device ID (DID) or the like. In another embodiment, the virtual graphics PCIe configuration space may comprise base address registers (BARs) such as BAR0 and BAR1 to BAR5 that may be a part of a control register set in the configuration space. For example, BARs may comprise memory-mapped I/O (MMIO) registers, or I/O registers, or memory regions. In another embodiment, for a virtual device, the VMM may store information such as virtual vendor and/or device ID in the PCI-e configuration registers; and/or may store any information that may be used by the driver to configure for the current situation in MMIO registers within one of the BARs. In one embodiment, VID/DID may be in configuration space but may not be within BAR0 or any other BAR; in some embodiments, VID and/or DID may be in any other register.

In one embodiment, VID may be a vendor ID that may be independent of underlying hardware, and may not change across insertion/revocation of the hardware such as VF 214 (or the graphics device 212). DID may be a virtual device ID (DID) that may have an ID value independent of underlying hardware, and may be persistent across insertion/revocation of the hardware such as VF 214. In another embodiment, BAR0 may map to one or more VMM emulated memory-mapped I/O (MMIO) registers that may be used to identify the underlying graphics device. In one embodiment, BAR0 may comprise two registers HW VID and HW DID; in some embodiments, BAR0 may comprise one or more registers. HW VID register may store a vender ID of the underlying graphics device, which may be emulated graphics device 226 or VF 214. HW DID register may store a device ID of the underlying graphics device, which may be emulated graphics device 226 or VF 214. In some embodiments, the vender ID, the device ID and BAR0 may not map to single-root I/O virtualization (SR-IOV) graphics hardware such as physical functions (PF) and/or virtual functions (VF). In another embodiment, the virtual graphics PCIe configuration space may have one or more registers such as BAR1 to BAR5 that may be over provided in number and/or size to cover one or more emulated graphic devices and/or one or more supported VF implementations; in some embodiments, a different number of redundant registers may be provided. VMM 220 may dynamically map the redundant BAR1 to BAR 5 to the registers of current active underlying graphics device such as active emulated graphics device 226 or VF 214.

In one embodiment, VMM 220 may maintain the same PCIe configuration space regardless whether emulated graphics device 226 or VF 214 is used, or which graphics hardware the virtual function is from. VMM 220 may maintains a mapping from the virtual graphics PCI configuration space (visible to guest OS) to the active underlying graphics device.

Referring to FIG. 2, the guest OS 230 may comprise a guest graphics driver 232. VMM 220 may provide a means for the guest graphics driver 232 to detect the active underlying device exposed by the combined virtual PCIe graphics device 222. In an embodiment, the guest graphics driver 232 may have a wrapper-plugin structure. Each of underlying device VGPU 226 and VF 214 may be managed by a corresponding plugin of the guest graphics driver 232. For example, the guest graphics driver 232 may comprise a driver plugin 236 for VGPU 226 and a plugin 238 for the VF 214. Each driver plugin for an underlying graphics device may have a knowledge about the BAR mapping of the underlying graphics device. In an embodiment, the wrapper 234 may detect the active underlying graphic device exposed by the combined virtual graphics device 222 and select a proper plugin that matches the detected underlying device. The wrapper 234 may determine a plugin for the currently active underlying device, and/or may switch to a new plugin in response to VMM 220 switching the underlying graphics device. The wrapper 234 may further provide a set of one or more standard graphics device driver interfaces (DDI) to guest OS 230 and/or graphics stack 244 and may maps the interfaces to the currently active plugin for execution. For example, OS may define a standard interface to the graphics stack, e.g., DirectX for Windows; however, some embodiments may utilize any standard interface.

For example, in response to the switch of underlying graphics device by VMM 220, the wrapper 234 may utilize a notification and screen-redraw to provide a user experience. In one embodiment, in response to VM migration, the wrapper 234 may notify the guest OS 230 and graphics stack 244 of the switch of underlying graphics device. For example, wrapper 234 may notify the guest OS 230 and the graphics stack 244 of the switch through time-out of a driver call, e.g., in Windows Vista. In another embodiment, wrapper 234 may prompt a recovery sequence from the guest OS 230 that may re-initialize the graphics device. In another embodiment, the guest graphics driver 232 may invoke a plugin for the active underlying device in response to the notification from the wrapper 234. In another embodiment, in response to the notification of the underlying graphics device switch upon VM migration, the graphics stack 244 and/or guest user interface (UI) application such as 242 may redraw their windows. In one embodiment, the guest OS 230 and graphics stack 244 may support graphics hardware reset and/or automatic redraw by graphics stack 244 and/or UI application 242. In the embodiment of FIG. 2, the guest user interface 240 may further comprise VM tools 246 that may be used for initiation and/or management of VM migration, e.g., with reference to FIGS. 4A and 4B.

Although FIG. 2 illustrates VGPU 226 and VF 214, in some embodiments, the combined virtual graphics device implemented by VMM 220 may cover one or more underlying hardware and/or software based devices and VMM 220 may switch between the multiple underlying devices in response to the devices becoming available or unavailable. While FIG. 2 illustrates an embodiment of combined virtual graphics device, in some embodiments, VMM 220 may switching between any other underlying devices to provide a combined virtual device to the guest based on availability of the underlying devices.

Figure 3:
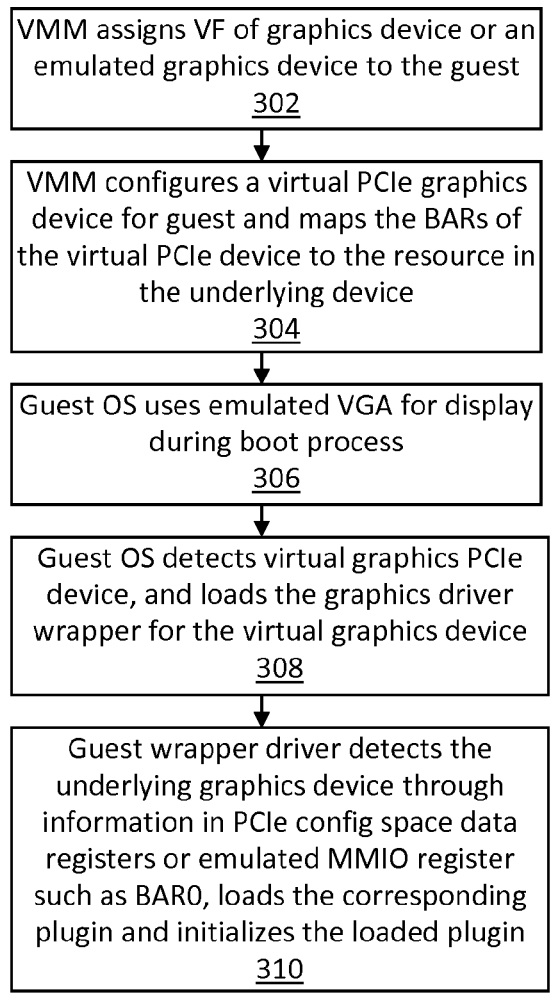
FIG. 3 is a flow diagram in accordance with some embodiments of the invention.

FIG. 3 is a flow chart illustrating an embodiment of a method according to an embodiment of the invention. In an embodiment, the flow of FIG. 3 may relate to guest startup. In block 302, VMM may assign an underlying graphics device such as a VF or an emulated graphics device to the guest OS. In block 304, VMM may configure a virtual PCIe graphics device for guest. For example, VMM may provide a combined virtual PCIe graphics device through the assigned underlying graphics device for the guest OS. In block 304, VMM may map BARs of the combined virtual PCIe graphics device to resource of the underlying graphics device that is assigned in block 302. In one embodiment, in block 306, guest OS may use emulated VGA exposed by the combined virtual PCIe graphics device for display during boot. In block 308, guest OS may detect the combined virtual graphics PCIe device and load the graphics driver wrapper such as 234 for the detected virtual graphics device. In block 310, guest wrapper driver may detect which underlying graphics device is active through information in virtual PCIe configuration space registers or emulated MMIO register such as BAR0. In block 310, guest wrapper driver may load the corresponding driver plugin for the detected active underlying graphics device such as emulated graphic device 226 or VF 214 and/or may initialize the active underlying graphics device by the loaded driver plugin.

Figure 4A:
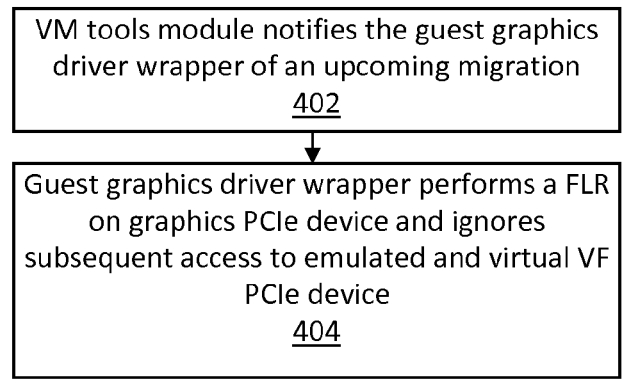
FIGS. 4A and 4B are schematic flow diagrams in accordance with some embodiments of the invention.

FIG. 4A is a flow chart illustrating an embodiment of a method according to an embodiment of the invention. In an embodiment, the flow of FIG. 4A may relate to operation to prepare for VM migration by a migration source platform on the guest. In block 402, VM tools module such as 246 in the guest VM may notify the guest graphics driver wrapper of the upcoming VM migration. In block 404, the guest graphics driver wrapper may perform PCIe function level reset (FLR) on the combined virtual graphics PCIe device and may ignore subsequent access to emulated graphics device such as VGPU 226 and virtual VF PCIe device such as VF device 214. In one embodiment, in response to the FLR, the guest may be ready for VM migration in response to the completion of FLR.

Figure 4B:
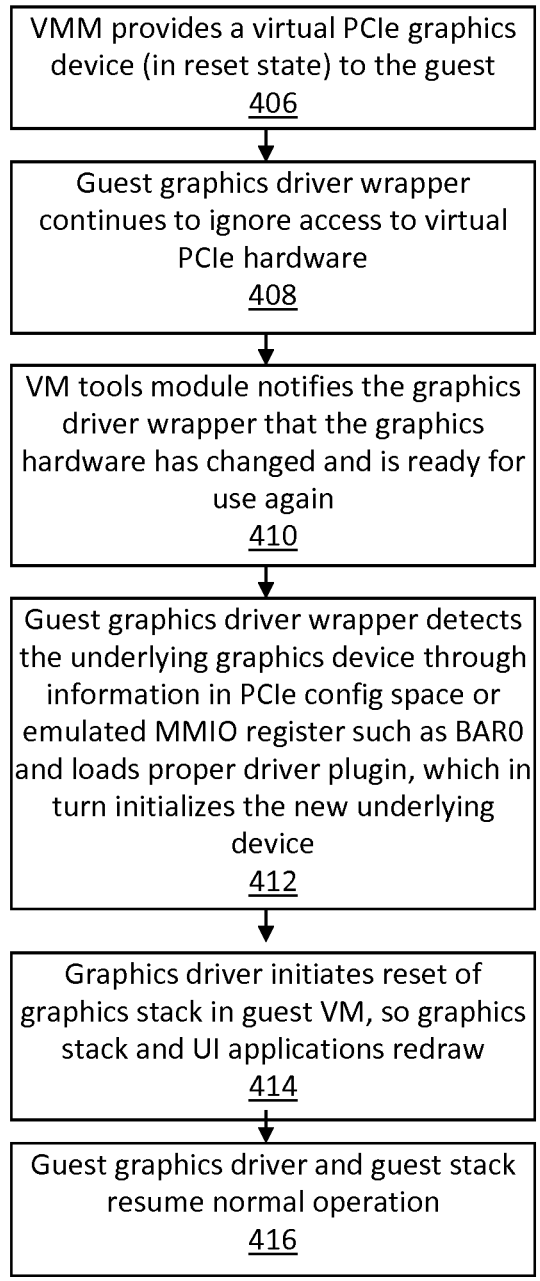

FIG. 4B is a flow chart illustrating an embodiment of a method according to an embodiment of the invention. In an embodiment, the flow of FIG. 4B may relate to operation for VM migration that may be performed by a migration target platform on the guest. In block 406, in response to the VM migration, e.g., from the first VM to the second VM, VMM may provide a combined virtual PCIe graphics device (e.g., in reset state by FLR as mentioned with regard to block 404) to the guest. For example, based on a target platform that the VM is to migrate to and/or VMM configuration, the combined virtual PCIe device may have emulated graphics such as VGPU 226 or VF such as 214 as its underlying device. In block 408, the guest graphics driver wrapper may continue to ignore access to the combined virtual PCIe device. In block 410, VM tools module may notify the guest graphics driver wrapper that the graphics hardware has changed and is ready for use again.

In block 412, the guest graphics driver wrapper may detect the underlying graphics device through information in PCIe configuration space and/or emulated MMIO register such as BAR0 and may load corresponding driver plugin for the detected underlying graphics device.

The guest graphics driver wrapper may utilize the loaded driver plugin to initialize the new detected underlying graphics device. In block 414, the guest graphics driver plugin may initiate reset of graphics stack in guest VM and the graphics stack and guest UI application(s) may redraw their windows or representation in response to the reset. In block 416, the guest graphics driver and the guest stack may resume normal operation.

While the flows of FIGS. 3, 4A and/or 4B are illustrated to comprise a sequence of processes, the flows in some embodiments may perform illustrated processes in a different order. In another embodiment, the flows of FIGS. 3, 4A and/or 4B may support live migration and/or saveVM/loadVM type of migration. In another embodiment, the flow of FIGS. 3, 4A and/or 4B may not require hot-plug/unplug capability from the guest OS and graphics device driver model. While the flows of FIGS. 3, 4A and/or 4B may be used for migration among one or more underlying graphics devices/functions, in some embodiments, the flows may be utilized to implement any other devices/functions plug-and-play support in the VMM. Some embodiments may expose a combined virtual graphics device that may change behavior along with changes in underlying devices to implement the graphics device plug-and-play support in the VMM. In one embodiment, the combined virtual graphics device may expose an interface that may be standard across all VMM implementations and the guest OS graphics device driver may be independent of any specific VMM implementation. In another embodiment, the combined virtual graphics device implemented by VMM may cover one or more underlying devices that may be based on hardware, software, firmware and/or their combination and may switch between the underlying devices as they become available or unavailable. In another embodiment, the combined virtual graphics device may expose a PCIe interface that may be standard across all VMM implementations. In yet another embodiment, the wrapper-plugin graphics device driver structure in the guest OS may switch to new plug-in modules as the underlying device changes its behaviors. The interface between the wrapper and the plugins may be standard for each guest OS type, and may not depend on any VMM implementation. In the combined virtual graphics device, one or more underlying graphics devices/functions may be combined into a single PCIe device. The combined virtual graphics device may be implemented by VMM, but may expose a PCIe interface to the guest OS that may be standard across all VMM implementations. In the wrapper-plugin graphics device driver in the guest OS, change of behavior in the underlying PCIe graphics device may be detected and appropriate plugin may be switched to.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A system, comprising:
a platform hardware;
a guest virtual machine; and
a virtual machine monitor to assign one of an emulated virtual device in the virtual machine monitor and a virtual function of a physical device in the platform hardware to the guest virtual machine, to expose a combined virtual device to the guest virtual machine through said one of the virtual device and the virtual function assigned by the virtual machine monitor, and to expose a configuration space for the combined virtual device to the guest virtual machine independent of said one of the emulated virtual device and the virtual function assigned by the virtual machine monitor.

2. The system of claim 1, further comprising:
a guest driver to detect which one of the emulated virtual device and the virtual function is active for the combined virtual device and to select a plugin that matches said one of the emulated virtual device and the virtual function detected by the guest driver.

3. The system of claim 2, further comprising:
a virtual machine tools module to notify the guest driver of a virtual machine migration.

4. The system of claim 2, wherein the guest driver comprises a wrapper-plugin structure, wherein the wrapper is to determine a plugin corresponding to said one of the emulated virtual device and the virtual function that is detected active by the guest drive.

5. The system of claim 1, wherein the virtual machine monitor is further to maintain a mapping from the configuration space to said one of the emulated virtual device and the virtual function detected by the guest driver.

6. The system of claim 1, wherein the virtual machine monitor is further to provide one or more fields in the configuration space to cover the emulated virtual device and the virtual function.

7. The system of claim 1, wherein the emulated virtual device comprises an emulated virtual graphics device to implement emulated graphics processing capability.

8. The system of claim 1, wherein the virtual machine monitor is further to switch between the emulated virtual device and the virtual function of the physical device within the combined virtual device, without triggering a plug-and-play event in a guest operating system of the guest virtual machine.

9. A method, comprising:
providing a combined virtual graphics device through one of an emulated virtual graphics device and a virtual function of a physical graphic device in a host;
exposing the combined virtual graphics device to a host;
exposing a PCIe configuration space for the combined virtual graphics device that is independent of which of the emulated virtual graphics device and the virtual function is active for the combined virtual graphics device.

10. The method of claim 9, further comprising:
switching between the emulated virtual graphics devices and the virtual function of the physical graphic device without a hot-plug/unplug from a guest operating system of the guest.

11. The method of claim 9, wherein the PCIe configuration space comprises one or more fields that map to the active one of the emulated virtual graphics device and the virtual function.

12. The method of claim 9, further comprising:
in response to a switch between the emulated virtual graphics device and the virtual function, determining a plugin driver corresponding to one of the emulated virtual graphics device and the virtual function that is switched to; and
initializing said one of the emulated virtual graphics device and the virtual function that is switched to.

13. The method of claim 9, further comprising:
performing a switch between the emulated virtual graphics device and the virtual function within the combined virtual graphics device, without triggering a plug-and-play event in a guest operating system of the guest virtual machine.

14. A non-transitory machine-readable medium containing instructions which, when executed by a processing system, cause the processing system to
assign one of a virtual function of a physical graphics device in a host and an emulated virtual graphics device to a guest;
exposing a virtual PCIe graphics device to the guest, wherein the virtual PCIe device has graphics capability through said one of the virtual function of the physical graphics device and the emulated graphics device that is assigned; and
in response to a virtual machine migration in the guest, perform a PCIe function level reset on the virtual PCIe graphics device to ignore access to the virtual function and the emulated virtual graphics device.

15. The non-transitory machine-readable medium of claim 14, further comprising a plurality of instructions that in response to being executed result in a computing device to:
detect which one of the virtual function and the emulated virtual graphics device is active for the virtual PCIe graphics device; and
select a plugin that matches one of the virtual function and the emulated virtual graphics device that is detected active.

16. The non-transitory machine-readable medium of claim 14, further comprising a plurality of instructions that in response to being executed result in a computing device to:
expose to the guest a PCIe configuration space for the virtual PCIe graphics device, wherein the PCIe configuration space is to cover configurations of the virtual function and the emulated virtual graphics device.

17. The non-transitory machine-readable medium of claim 14, further comprising a plurality of instructions that in response to being executed result in a computing device to:
 switch between the virtual function and the physical graphics device that are underlying the virtual PCIe graphics device based on the migration.

\* \* \* \* \*